(12) United States Patent
Liao et al.

(10) Patent No.: US 11,112,558 B2
(45) Date of Patent: Sep. 7, 2021

(54) LIGHT GUIDE MODULE AND DISPLAY MODULE HAVING THE SAME

(71) Applicant: E Ink Holdings Inc., Hsinchu (TW)

(72) Inventors: Ching-Huan Liao, Hsinchu (TW); Hsin-Tao Huang, Hsinchu (TW)

(73) Assignee: E Ink Holdings Inc., Hsinchu (TW)

(*) Notice: Subject to any disclaimer, the term of this patent is extended or adjusted under 35 U.S.C. 154(b) by 0 days.

(21) Appl. No.: 16/903,362

(22) Filed: Jun. 16, 2020

(65) Prior Publication Data

US 2021/0003771 A1    Jan. 7, 2021

(30) Foreign Application Priority Data

Jul. 3, 2019 (TW) .................................. 108123474

(51) Int. Cl.
    *F21V 8/00*      (2006.01)

(52) U.S. Cl.
    CPC .......... *G02B 6/0076* (2013.01); *G02B 6/0036* (2013.01); *G02B 6/0065* (2013.01); *G02B 6/0093* (2013.01)

(58) Field of Classification Search
    CPC .......................................... G02B 6/0036–0093
    USPC ............... 362/97.1–97.4, 606–607, 615–616
    See application file for complete search history.

(56) References Cited

U.S. PATENT DOCUMENTS

| | | |
|---|---|---|
| 7,429,709 B2 | 9/2008 | Kim |
| 7,786,394 B2 | 8/2010 | Gao et al. |
| 8,400,583 B2 * | 3/2013 | Yusa .................... G02B 6/0088 349/64 |
| 9,285,530 B2 * | 3/2016 | Neugebauer ......... G02B 6/0036 |
| 9,704,672 B1 | 7/2017 | Sun |
| 9,710,087 B1 | 7/2017 | Jayaraj et al. |
| 9,899,164 B1 | 2/2018 | Wang |
| 2002/0140348 A1 * | 10/2002 | Takeuchi ................ G09F 9/372 313/581 |
| 2014/0192272 A1 * | 7/2014 | Kang .................. G02F 1/13338 349/12 |

FOREIGN PATENT DOCUMENTS

| | | |
|---|---|---|
| TW | I271584 B | 1/2007 |
| TW | I367310 B | 7/2012 |
| TW | 201617702 A | 5/2016 |
| TW | M523864 U | 6/2016 |
| TW | I544254 B | 8/2016 |

OTHER PUBLICATIONS

Che-Wen Chiang et al., "Design and demonstration of high efficiency anti-glare LED luminaires for indoor lighting", Optics Express, vol. 23, No. 3, Feb. 9, 2015.
Chao-Ching Chang et al., "Preparation of polymer/silica composite antiglare coatings on poly(ethylene terphathalate) (PET) substrates", Journal of Coatings Technology and Research, 2012, pp. 561-568.
Corresponding Taiwan office action dated Apr. 9, 2020.

\* cited by examiner

*Primary Examiner* — Jason M Han
(74) *Attorney, Agent, or Firm* — CKC & Partners Co., LLC (57) ABSTRACT

A light guide module includes a light guide element and a light source. The light guide element includes a first light guide layer and a second light guide layer. The second light guide layer is disposed on the first light guide layer. The refractive index of the first light guide layer is greater than the refractive index of the second light guide layer. The light source is disposed in the first light guide layer.

20 Claims, 7 Drawing Sheets

LIGHT GUIDE MODULE AND DISPLAY MODULE HAVING THE SAME

CROSS-REFERENCE TO RELATED APPLICATION

This application claims priority to Taiwan Application Serial Number 108123474, filed Jul. 3, 2019, which is herein incorporated by reference in its entirety.

BACKGROUND

Field of Invention

The present disclosure relates to a light guide module and a display module having the light guide module.

Description of Related Art

A light guide element of a typical light guide module is adhered with a cover lens so as to protect the surface of the light guide element. However, since the fabrication of the light guide element and the cover lens cannot be integrated, the fabrication process of the light guide module has become more complicated.

Moreover, for an input device with a light guide element (e.g., keyboard), the figures or textures on the button are fixed and cannot be changed. However, for a high level keyboard (e.g., keyboard for eSports), it is required to exchange the textures or figures displayed on the button based on the user setting. Therefore, there is still a developing need for an input device of which the textures or figures of the button can be exchanged arbitrarily.

SUMMARY

An aspect of the present disclosure is to provide a light guide module applied in a reflective display panel.

According to some embodiments of the disclosure, a light guide element includes a first light guide layer and a light source. The light guide element includes a first light guide layer and a second light guide layer. The second light guide layer is disposed on the first light guide layer, and a refractive index of the first light guide layer is greater than a refractive index of the second light guide layer. The light source is disposed in the first light guide layer, and the first light guide layer that the light source is located is closer to the reflective display panel than the second light guide layer.

In some embodiments of the disclosure, a material of the first light guide layer is Polycarbonate (PC).

In some embodiments of the disclosure, a material of the second light guide layer is Polymethyl methacrylate (PMMA).

In some embodiments of the disclosure, a refractive index of the first light guide layer is in a range from about 1.49 to about 1.6, and a refractive index of the second light guide layer is in a range from about 1.4 to about 1.49.

In some embodiments of the disclosure, the light guide element includes a periphery area and a display area, the light guide module further includes a light blocking layer covering the periphery area of the light guide element.

In some embodiments of the disclosure, the light guide module further includes housing and a light blocking layer. The housing surrounds the light guide element. The light blocking layer covers the housing.

In some embodiments of the disclosure, the light guide module further includes a hard coating layer covering the light blocking layer and the light guide element.

In some embodiments of the disclosure, the light guide module further includes an anti-glare layer covering the light blocking layer and the light guide element.

In some embodiments of the disclosure, a surface of the first light guide layer has a microstructure.

In some embodiments of the disclosure, the light guide module includes a third light guide layer disposed on a bottom surface of the first light guide layer, between the first light guide layer and the second light guide layer, or on a top surface of the second light guide layer. A refractive index of the third light guide layer is smaller than the refractive index of the first light guide layer.

Another aspect of the present disclosure is to provide a display module.

According to some embodiments of the disclosure, the display module includes a light guide module and a reflective display panel. The light guide module includes a light guide element and a light source. The light guide element includes a first light guide layer and a second light guide layer. The second light guide layer is disposed on the first light guide layer, and a refractive index of the first light guide layer is greater than a refractive index of the second light guide layer. The light source is disposed in the first light guide layer. The reflective display panel is located below the light guide element, and the first light guide layer that the light source is located is closer to the reflective display panel than the second light guide layer.

In some embodiments of the disclosure, a material of the first light guide layer is Polycarbonate (PC).

In some embodiments of the disclosure, a material of the second light guide layer is Polymethyl methacrylate (PMMA).

In some embodiments of the disclosure, a refractive index of the first light guide layer is in a range from about 1.49 to about 1.6, and a refractive index of the second light guide layer is in a range from about 1.4 to about 1.49.

In some embodiments of the disclosure, the light guide element includes a periphery area and a display area, the light guide module further includes a light blocking layer covering the periphery area of the light guide element.

In some embodiments of the disclosure, the display module further includes housing and a light blocking layer. The housing surrounds the light guide element and the reflective display panel. The light blocking layer covers the housing.

In some embodiments of the disclosure, the display module further includes a hard coating layer covering the light blocking layer and the light guide element.

In some embodiments of the disclosure, the display module further includes an anti-glare layer covering the light blocking layer and the light guide element.

In some embodiments of the disclosure, a surface of the first light guide layer has a microstructure.

In some embodiments of the disclosure, the display module includes a third light guide layer disposed on a bottom surface of the first light guide layer, between the first light guide layer and the second light guide layer, or on a top surface of the second light guide layer. A refractive index of the third light guide layer is smaller than the refractive index of the first light guide layer.

In the aforementioned embodiments, since the light source is disposed in the first light guide layer, and the refractive index of the first light guide layer is greater than the refractive index of the second light guide layer, the efficiency of light transmission and the light uniformity may be improved. The first light guide layer and the second light guide layer can be considered as an integrated structure of the typical cover lens and the light guide plate, thereby simplifying the complexity of the individual process of the typical cover lens and the light guide plate. Moreover, the reflective display panel may control the figure displayed through the input device (e.g., keyboard) in which the light guide element is applied. Therefore, the texture or figure of the button can be exchanged arbitrarily by the users.

It is to be understood that both the foregoing general description and the following detailed description are by examples, and are intended to provide further explanation of the invention as claimed.

BRIEF DESCRIPTION OF THE DRAWINGS

The disclosure can be more fully understood by reading the following detailed description of the embodiment, with reference made to the accompanying drawings as follows.

DETAILED DESCRIPTION

Reference will now be made in detail to the present embodiments of the disclosure, examples of which are illustrated in the accompanying drawings. Wherever possible, the same reference numbers are used in the drawings and the description to refer to the same or like parts.

Figure 1:
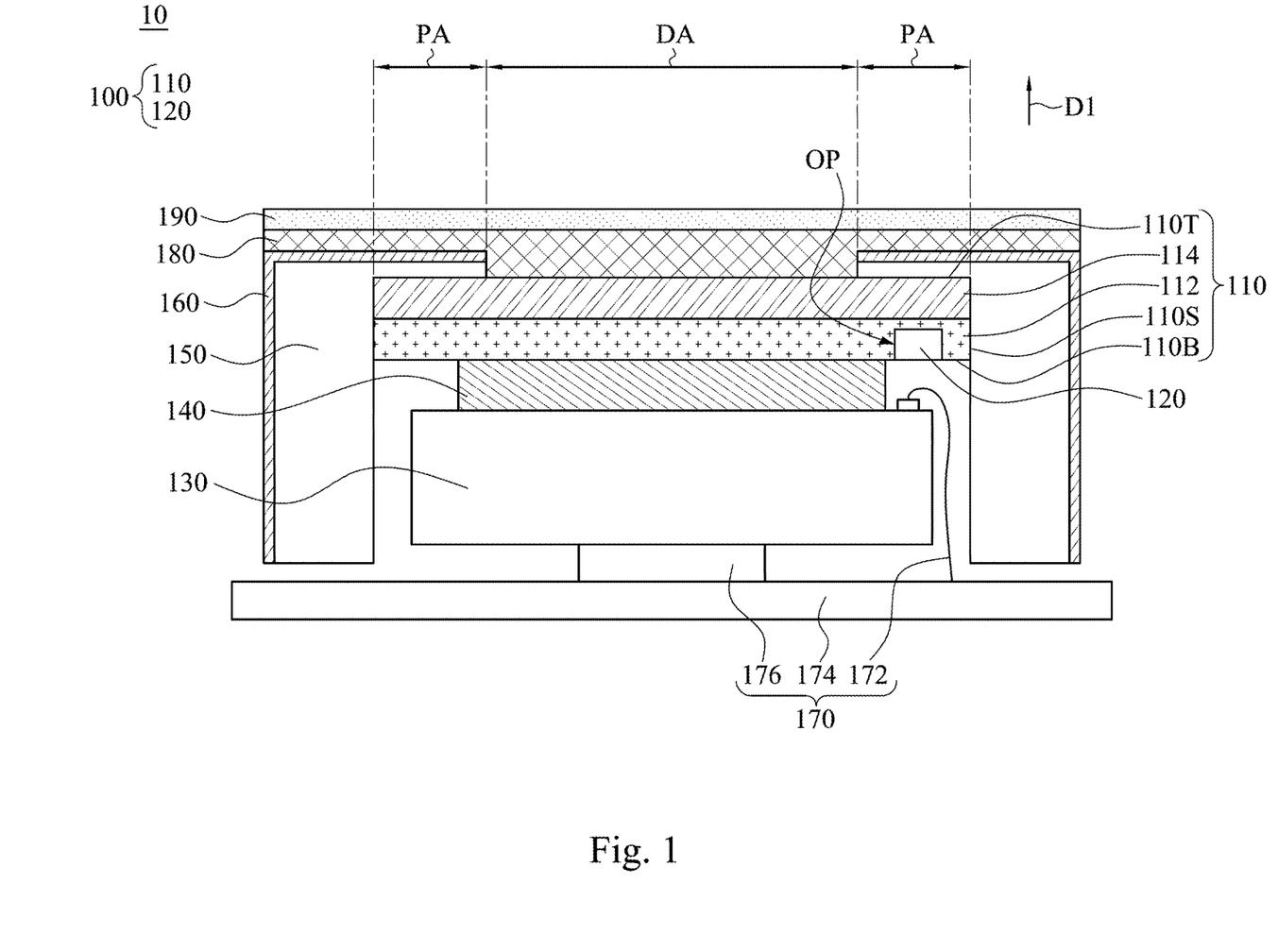
FIG. 1 is a cross-sectional view of a display module according to some embodiments of the present disclosure.

FIG. 1 is a cross-sectional view of a display module 10 according to some embodiments of the present disclosure. As shown in FIG. 1, in the present embodiment, the display module 10 includes a light guide module 100 and a reflective display panel 130. The light guide module 100 includes a light guide element 110 and a light source 120. The light guide element 110 is formed by stacking multiple layers of materials. The light guide element 100 is configured to transmit a light from the light source 120 to the reflective display panel 130. In the present embodiment, the light guide element 110 includes a first light guide layer 112 and a second light guide layer 114. The second light guide layer 114 is disposed on the first light guide layer 112. The light source 120 is, for example, a LED light source. The light source 120 is disposed in the first light guide layer 112. The reflective display panel 130 is, for example, a reflective liquid crystal display or an electrophoretic display. The reflective display panel 130 is located below the light guide element 110. The reflective display panel 130 is adhered with the light guide element 110 through an optical adhesive 140.

Figure 2:
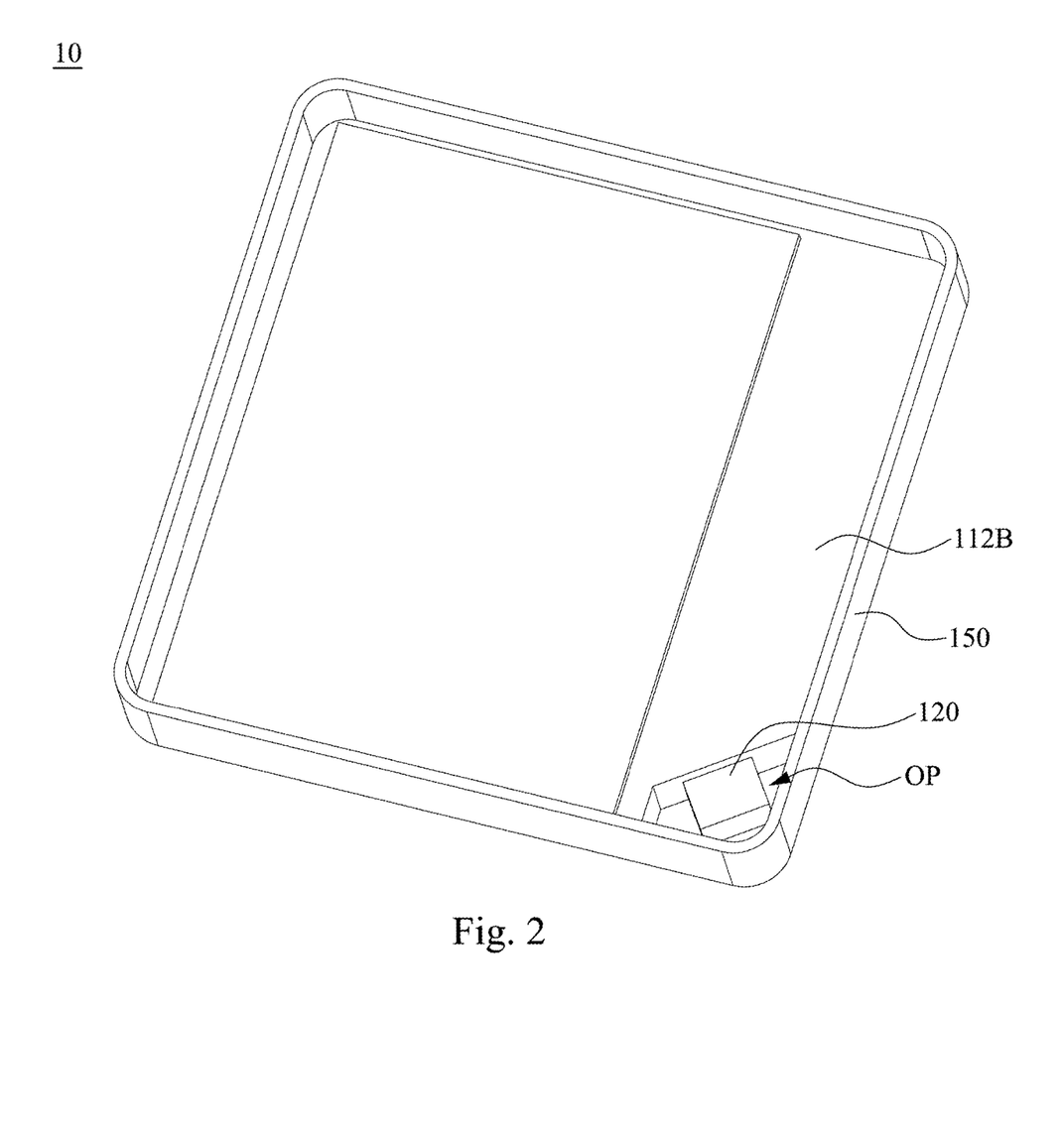
FIG. 2 is a partial bottom view of the display module in FIG. 1, in which a system circuit, a reflective display panel, and an optical adhesive are omitted.

FIG. 2 is a partial bottom view of the display module 10 in FIG. 1, in which the system circuit 170, the reflective display panel 130, and the optical adhesive 140 are omitted. Reference is made to FIG. 1 and FIG. 2. The light guide element 110 has a top surface 110T, a side surface 110S, and a bottom surface 110B. The top surface 110T can be divided as a display area DA and a periphery area PA. The bottom surface 110B faces the reflective display panel 130, and is adhered with the reflective display panel 130 through optical adhesive 140. The first light guide layer 112 has a recess OP recessed inward from the bottom surface 110B. The light source 120 is disposed in the recess OP. The recess OP is merely located inside the first light guide layer 112, but not extends to the second light guide layer 114. As shown in FIG. 2, the recess OP is located at a corner of the first light guide layer 112. In some embodiments, the recess OP may be located at a side of the first light guide layer 112. Specifically, as shown in FIG. 1, the light source 120 overlaps the periphery area PA of the light guide element 110 in the first direction D1, and the light source 120 does not overlap the display area DA of the light guide element 110 in the first direction D1.

Reference is made to FIG. 1, in the present embodiment, the material of the first light guide layer 112 is Polycarbonate (PC), and the first light guide layer 112 has a refractive index in a range from 1.49 to 1.6. The material of the second light guide layer 114 is Polymethyl methacrylate (PMMA), and the second light guide layer 114 has a refractive index in a range from about 1.4 to about 1.49. That is, the refractive index of the first light guide layer 112 is greater than the refractive index of the second light guide layer 114, and the light source 120 is disposed in first light guide layer 112 that has the greater refractive index. In other words, the first light guide layer 112 is the main light guide layer. The possibility of the total internal-reflection for the light in the first light guide layer 112 can be increased through the refractive index difference between the first light guide layer 112 and the second light guide layer 114, thereby increasing the light transmission and improving the light uniformity. As such, the display intensity of the reflective display panel 130 can be more uniform. In some embodiments, the first light guide layer 112 and the second light guide layer 114 can be a composite material (PMC) formed by double injection molding. In other words, the first light guide layer 112 and the second light guide layer 114 are formed simultaneously, and there is no need to adhere the first light guide layer 112 and the second light guide layer 114 through adhesive, for example, the optical adhesive. Moreover, the first light guide layer 112 and the second light guide layer 114 can be considered as a integrated structure of the typical cover lens and the light guide plate, thereby simplifying the complexity of the process to individually fabricate the typical cover lens and the light guide plate.

In some embodiments, the display module 10 further includes a housing 150 and a light blocking layer 160. The housing 150 surrounds the light guide element 110 and the reflective display panel 130. In the present embodiment, the housing 150 covers the periphery area PA of the light guide element 110 and the side surface 110S. The light blocking layer 160 covers the housing 150 through spray finishing or printing. Specifically, in the present embodiment, the light blocking layer 160 covers a top surface of the housing 150 through spray finishing or printing. That is, the housing 150 and the light blocking layer 160 define the display area DA and the periphery area PA of the light guide element 110. In other words, the light blocking layer 160 overlaps the periphery area PA of the light guide element 110 in the first direction D1, but does not overlap the display area DA of the light guide element 110. As such, the housing 150 and the light blocking layer 160 can prevent the light of the light source 120 from leaking through the periphery area PA. Moreover, the light blocking layer 160 may cover the sidewall of the housing 150, thereby preventing the light of the light source 120 from laterally leaking through the housing 150. As such, since the light blocking layer 160 may provide sufficient shading ability for the light source 120, the selection flexibility for the material of the housing 150 can be increased.

In some embodiments, the display module 10 further includes a system circuit 170. The system circuit 170 includes a cable 172, a circuit board 174 and an elastic contact element 176. In some embodiments, the display module 10 is a button of a keyboard or a mouse. The display module 10 displays textures or figures through the reflective display panel 130. The display module 10 controls the reflective display panel 130 through the system circuit 170. The reflective display panel 130 is electrically connected to the circuit board 174 through cable 172. The elastic contact element 176 connects the reflective display panel 130 and the circuit board 174 and can be act as a switch of the reflective display panel 130. For example, when an external force is applied on the light guide element 110 or the housing 150, the elastic contact element 176 is pushed and is electrically connected to the circuit board 174, thereby displaying the figures or erasing the figures. When the external force is removed, the elastic contact element 176 pushes the housing 150, the light guide element 110, and the reflective display panel 130 back to the original positions (the state shown in FIG. 1). Moreover, the figures displayed by the display module 10 are determined by the reflective display panel 130, but not the figures printed on the typical button. In other words, the system circuit 170 can change the figures displayed by the reflective display panel 130, such that the textures or figures of each of the display module 10 (e.g., the button) can be changed arbitrarily.

For example, for a high level keyboard (e.g., keyboard for eSports), it is required to exchange the textures or figures displayed on the button based on the user setting. Therefore, by controlling the figures displayed by the reflective display panel 130 of each of the button respectively through the system circuit 170, the textures or figures of the button can be changed arbitrarily.

In some embodiments, the display module 10 further includes a hard coating layer 180. The hard coating layer 180 covers the light blocking layer 160 and the light guide element 110. Specifically, in the embodiment shown in FIG. 1, the hard coating layer 18 covers the display area DA of the light guide element 110 and the light blocking layer 160 located at the periphery area PA. The hard coating layer 180 is configured to protect the light blocking layer 160 that is located on the periphery area PA of the light guide element 110 to prevent the light blocking layer 160 from peeling off. Moreover, the hard coating layer 180 is wear resistant, such that the structure strength of the light guide element 110 can be increased and the light guide element 110 can be avoided from damage or scratch.

In some embodiments, the display module 10 further includes an anti-glare layer 190. The anti-glare layer 190 covers the light blocking layer 160 and the light guide element 110. In the present embodiments, the anti-glare layer 190 is located on the hard coating layer 180. The anti-glare layer 190 can eliminate the light reflected from the surface of the light guide element 110 or the surface of the hard coating layer 180 that may disturb the eye sight of the users.

Figure 3:
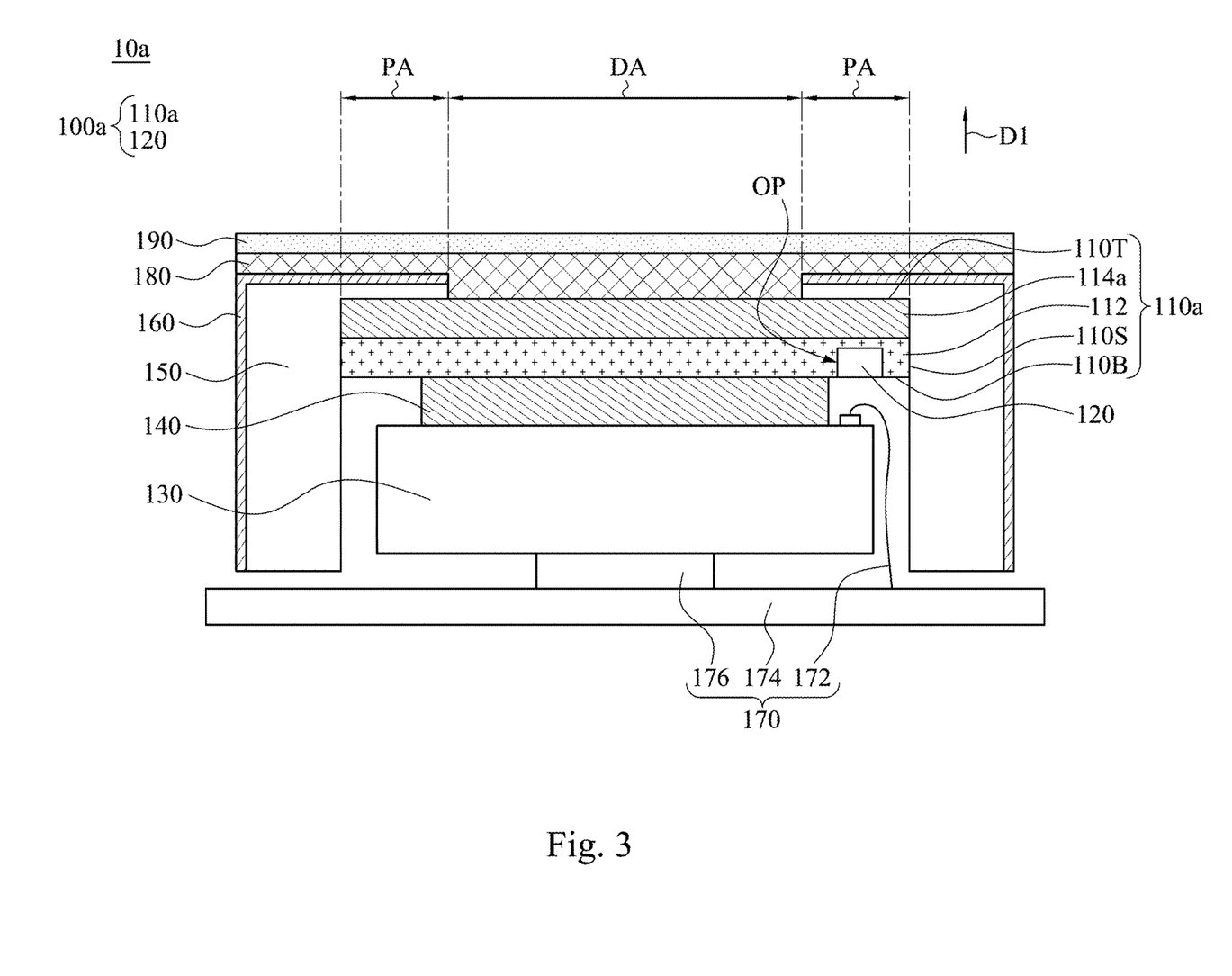
FIG. 3 is a cross-sectional view of a display module according to some other embodiments of the present disclosure.

FIG. 3 is a cross-sectional view of a display module 10a according to some other embodiments of the present disclosure. The display module 10a is similar to the display module 10 in FIG. 1, the difference is that the second light guide layer 114a of the light guide element 110a of the light guide module 100a is made of optical adhesive, and a refractive index of the second light guide layer 114a is 1.47. With such design, the refractive index of the first light guide layer 112 (the aforementioned PC, refractive index is 1.49-1.6) is still greater than the refractive index of the second light guide layer 114a. Therefore, the light guide element 110a may increase the light transmission and improving the light uniformity. In some other embodiments, the first light guide layer 112 can be made by PMMA (the second light guide layer 114 in FIG. 1), and the second light guide layer 114a can be made by optical adhesive, as long as the refractive index of the first light guide layer 112 in which the light source 112 is located is greater than the refractive index of the second light guide layer 114a.

Figure 4:
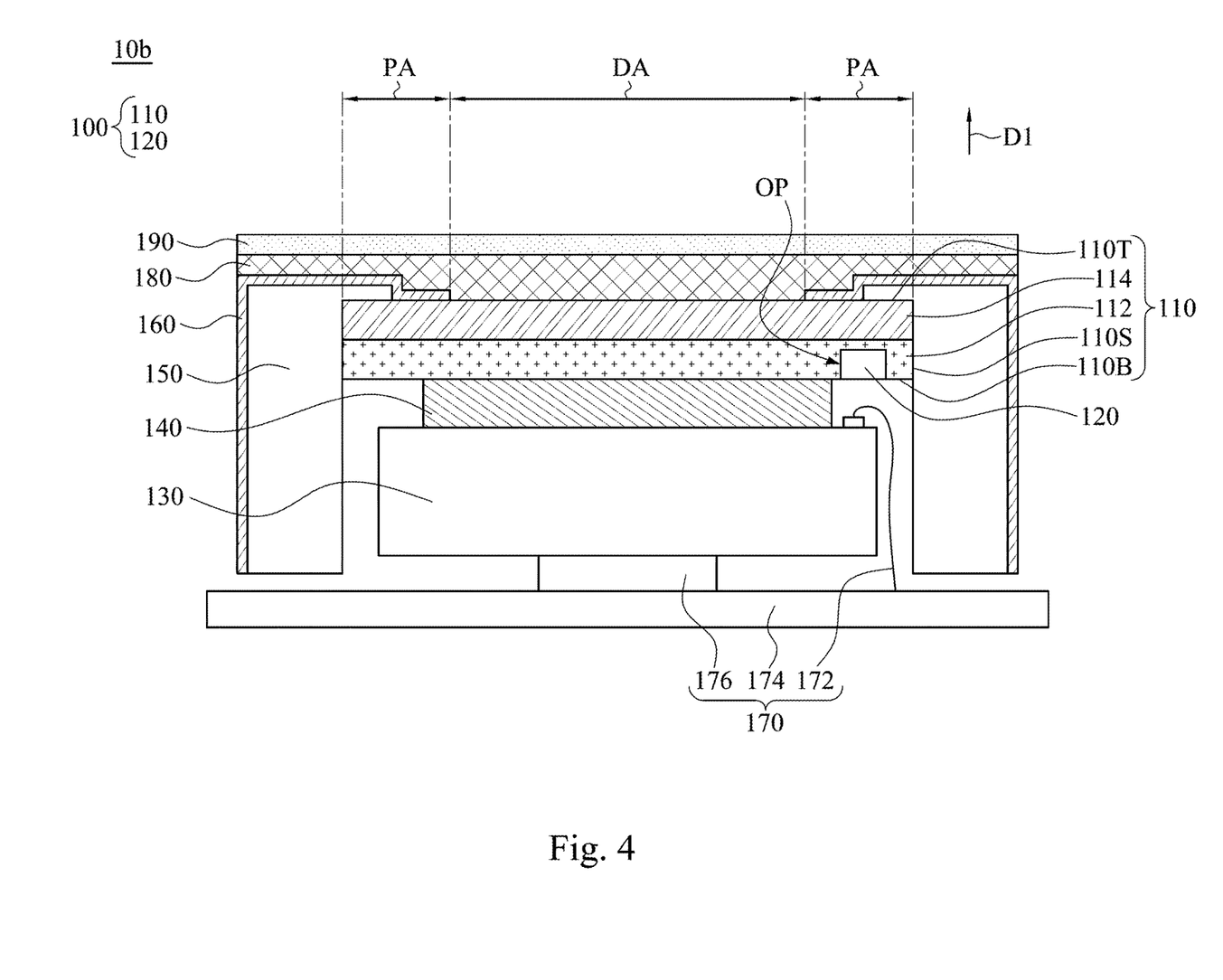
FIG. 4 is a cross-sectional view of a display module according to some other embodiments of the present disclosure.

FIG. 4 is a cross-sectional view of a display module 10b according to some other embodiments of the present disclosure. The display module 10b is similar to the display module 10 in FIG. 1, the difference is that the housing 150 of the display module 10b partially covers the periphery area PA of the light guide element 110, and the light of the light source 120 is blocked by the light blocking layer 160 that covers the periphery area PA of the light guide element 110. That is, in the present embodiment, the blocking layer 160 is in contact with the housing 150 and the top surface 110T of the light guide element 110. In some other embodiments, the housing 150 can merely surround the side surface 110S of the light guide element 110. In other words, the housing 150 can be partially overlapped with the periphery area PA or the housing 150 may be not overlapped with the periphery area PA, and the light of the light source 120 is blocked from the periphery PA merely by the light blocking layer 160. It is noted that, although the top surface of the display module 10 illustrated is flat, the present disclosure is not limited in this regard. For example, when the display module 10 is a button, the surface pressed by the external force from a user can be adjusted based on the stacked condition of the housing 150 and the top surface 110T of the light guide element 110. As such, the button may have a better sense of contact without affecting the efficiency of blocking the light by the light blocking layer 160.

Figure 5A:
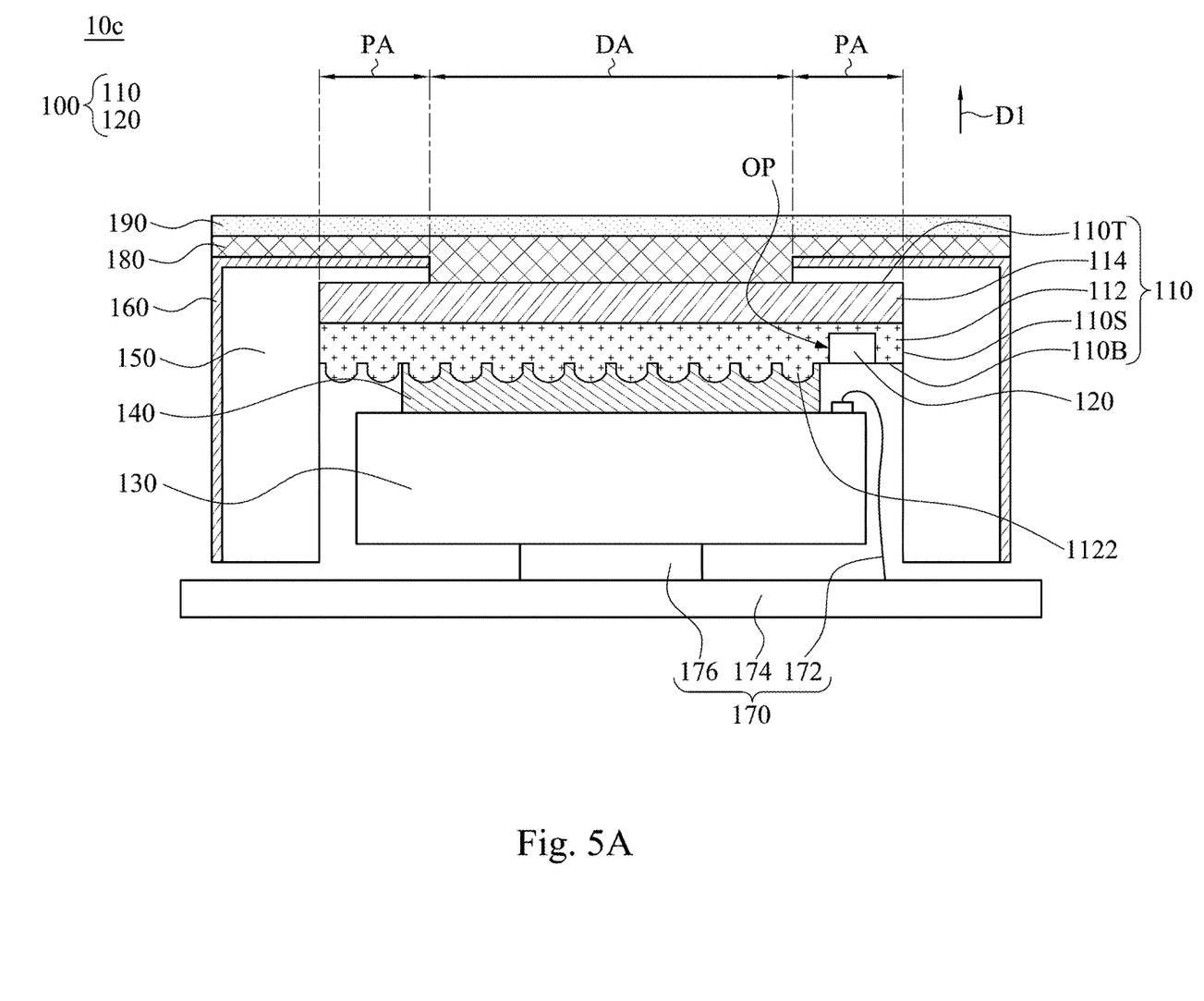
FIG. 5A is a cross-sectional view of a display module according to some other embodiments of the present disclosure.

FIG. 5A is a cross-sectional view of a display module 10c according to some other embodiments of the present disclosure. The first light guide layer 112 of the display module 10c has a microstructure 1122, and the microstructure 1122 is formed on the bottom surface 1106 of the first light guide layer 112. For example, the microstructure 1122 may has multiple bumps with different shapes. In different embodiments, the microstructure 1122 may be circular-shape, ellipse-shaped, or zigzag-shaped. In some embodiments, the microstructure 1122 may be formed through injection molding or hot embossing. In some other embodiments, the microstructure 1122 may be dot structures formed by printing. The angle change of the surface of the microstructure 1122 may increase the transmission efficiency of the light from the light source 120 in all directions, thereby improving the brightness uniformity of the light guide element 110.

Figure 5B:
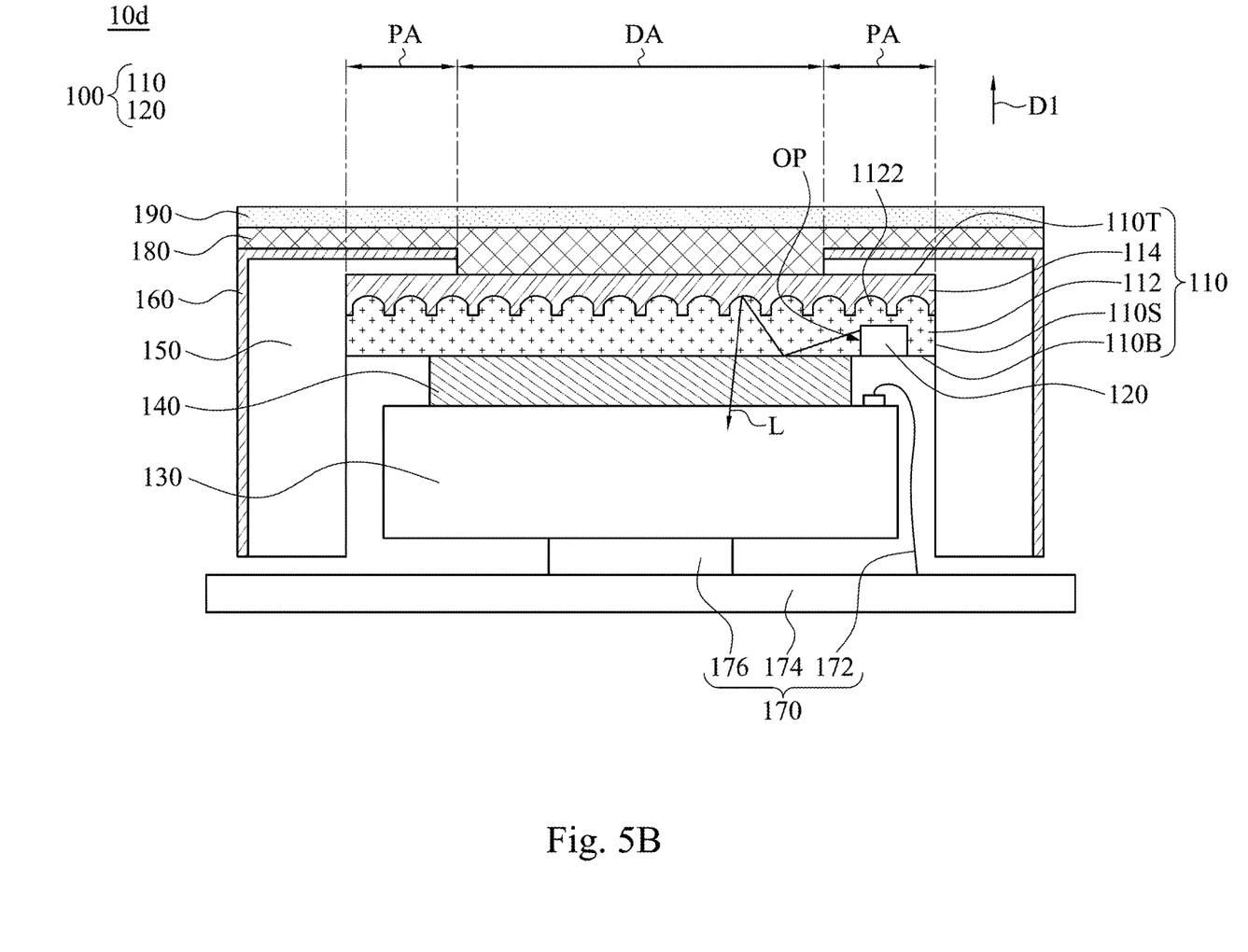
FIG. 5B is a cross-sectional view of a display module according to some other embodiments of the present disclosure.

FIG. 5B is a cross-sectional view of a display module 10d according to some other embodiments of the present disclosure. The first light guide layer 112 of the display module 10d has a microstructure 1122, and the microstructure 1122 is formed on the interface between the first light guide layer 112 and the second light guide layer 114. As shown in FIG. 5B, when the microstructure 1122 is formed on the interface between the first light guide layer 112 and the second light guide layer 114, the light transmit toward the top surface 110T of the light guide element 110 may be guided to the reflective display panel 130, thereby increasing the brightness of the reflective display panel 130, for example, as shown by the light path indicated by the light L.

Figure 6:
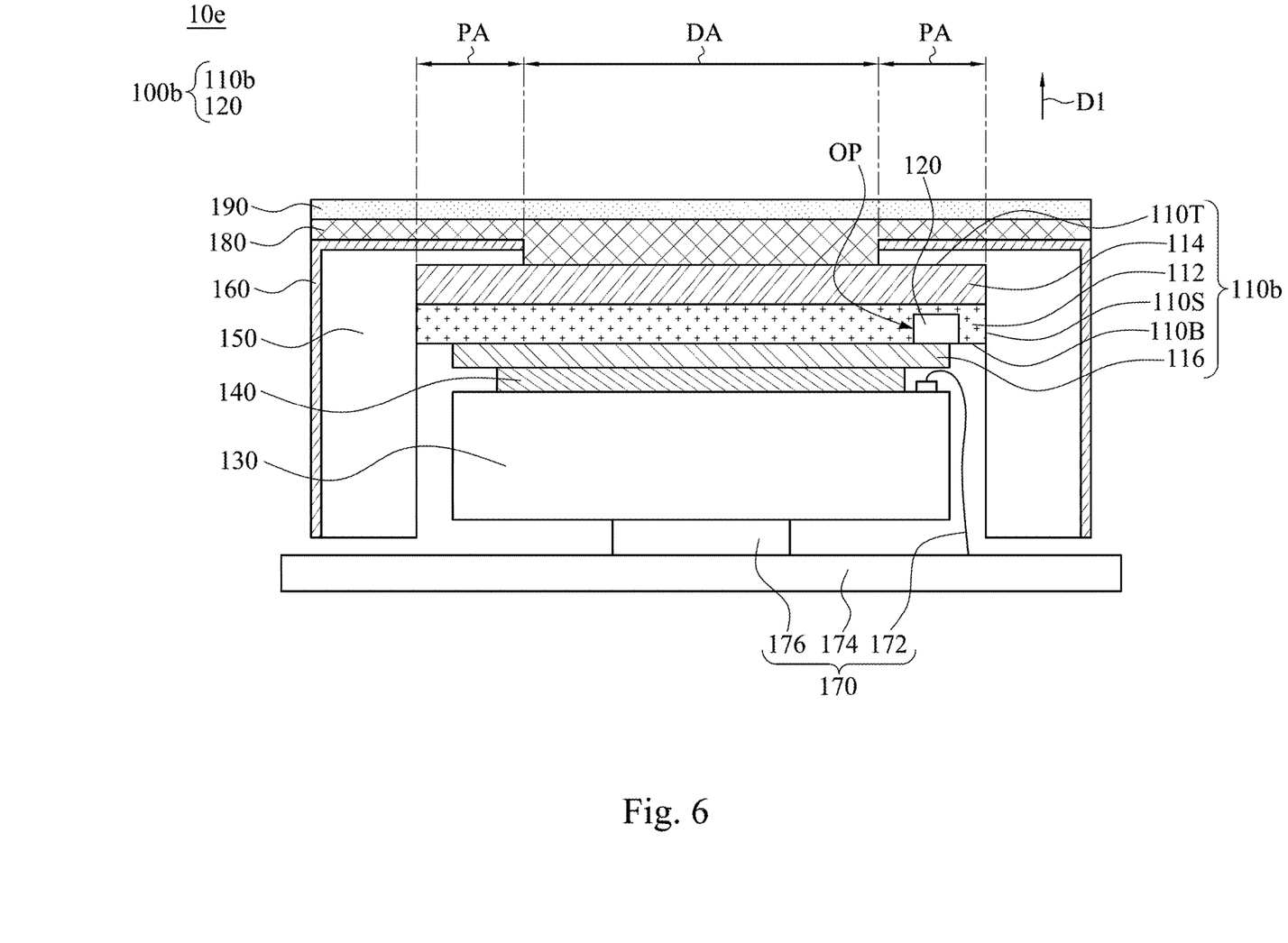
FIG. 6 is a cross-sectional view of a display module according to some other embodiments of the present disclosure.

FIG. 6 is a cross-sectional view of a display module 10e according to some other embodiments of the present disclosure. The display module 10e is similar to the display module 10 in FIG. 1, the difference is that the light guide element 110b of the light guide module 100b has the first light guide layer 112, the second light guide layer 114, and a third light guide layer 116. In the present embodiment, the third light guide layer 116 is located between the first light guide layer 112 and the optical adhesive 140. That is, the third light guide layer 116 is located on a bottom surface of the first light guide layer 112. The refractive index of the third light guide layer 116 is smaller than the refractive index of the first light guide layer 112, such that the efficiency of the light transmission and the light uniformity may be improved through the refractive index difference between the first light guide layer 112 and third light guide layer 116. In other embodiments, the third light guide layer 116 may be located between the first light guide layer 112 and the second light guide layer 114, or located on the top surface of the second light guide layer 114 (that is the top surface 110T of the light guide element 110b in FIG. 6), as long as the refractive index of the third light guide layer 116 is smaller than the refractive index of the first light guide layer 112. In some embodiments, as described above, if the material of the first light guide layer 112 is PC, the material of the third light guide layer 116 may be PMMA.

In some embodiments, widths of different light guide layers may be different. In other words, the entire side surface 110S of the light guide element 110b may be flat, or may be non-flat. For example, as shown in FIG. 6, a width of the third light guide layer 116 is smaller than a width of the first light guide layer 112. That is, the third light guide layer 116 is partially overlapped with the periphery area PA of the light guide element 110b in the first direction D1. The third light guide layer 116 covers a portion of the recess OP of the first light guide layer 112 and a portion of the light source 120. In some other embodiments, the third light guide layer 116 and the first light guide layer 112 may be substantially aligned and overlapped. As such, the light with higher intensity around the light source 120 may be prevented from leaking through the recess OP of the first light guide layer 112.

In some embodiments, the light guide element 110b is adhered with the housing 150 through one or more among the first light guide layer 112, the second light guide layer 114, or the third light guide layer 116. For example, in the embodiment shown in FIG. 6, the light guide element 110b is adhered with the housing 150 through the first light guide layer 112 and the second light guide layer 114. In other words, the third light guide layer 116 is not adhered with the housing 150, therefore, the entire side surface 110S of the light guide element 110b is partially adhered with the housing 150.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A light guide module applied in a reflective display panel, comprising:
   a light guide element comprising a first light guide layer and a second light guide layer, wherein the second light guide layer is disposed on the first light guide layer, and a refractive index of the first light guide layer is greater than a refractive index of the second light guide layer;
   a light source disposed within the first light guide layer, wherein the first light guide layer is closer to the reflective display panel than the second light guide layer; and
   a light blocking layer disposed at a side of the light guide element facing away from the reflective display panel.

2. The light guide module of claim 1, wherein a material of the first light guide layer is Polycarbonate (PC).

3. The light guide module of claim 1, wherein a material of the second light guide layer is Polymethyl methacrylate (PMMA).

4. The light guide module claim 1, wherein a refractive index of the first light guide layer is in a range from 1.49 to 1.6, and a refractive index of the second light guide layer is in a range from 1.4 to 1.49.

5. The light guide module of claim 1, wherein the light guide element comprises a periphery area and a display area, and the
   light blocking layer covers the periphery area of the light guide element.

6. The light guide module of claim 1, further comprising:
   a housing surrounding the light guide element, and the light blocking layer covers the housing.

7. The light guide module of claim 1, further comprising:
   a hard coating layer covering the light blocking layer and the light guide element.

8. The light guide module of claim 1, further comprising:
   an anti-glare layer covering the light blocking layer and the light guide element.

9. The light guide module of claim 8, wherein a surface of the first light guide layer has a microstructure.

10. The light guide module of claim 1, further comprising:
    a third light guide layer disposed on a bottom surface of the first light guide layer, between the first light guide layer and the second light guide layer, or on a top surface of the second light guide layer, wherein a refractive index of the third light guide layer is smaller than the refractive index of the first light guide layer.

11. A display module, comprising:
    a light guide module, comprising:
       a light guide element comprises a first light guide layer and a second light guide layer, wherein the second light guide layer is disposed on the first light guide layer, and a refractive index of the first light guide layer is greater than a refractive index of the second light guide layer;
       a light source disposed within the first light guide layer; and
       a light blocking layer disposed at a side of the light guide element facing away from the reflective display panel; and
    a reflective display panel located below the light guide element, wherein the first light guide layer is closer to the reflective display panel than the second light guide layer.

12. The display module of claim 11, wherein a material of the first light guide layer is Polycarbonate (PC).

13. The display module of claim 11, wherein a material of the second light guide layer is Polymethyl methacrylate (PMMA).

14. The display module of claim 11, wherein a refractive index of the first light guide layer is in a range from 1.49 to 1.6, and a refractive index of the second light guide layer is in a range from 1.4 to 1.49.

15. The display module of claim 11, wherein the light guide element comprises a periphery area and a display area, and the
light blocking layer covers the periphery area of the light guide element.

16. The display module of claim 11, further comprising:
a housing surrounding the light guide element and the reflective display panel, and the
light blocking layer covers the housing.

17. The display module of claim 11, further comprising:
a hard coating layer covering the light blocking layer and the light guide element.

18. The display module of claim 11, further comprising:
an anti-glare layer covering the light blocking layer and the light guide element.

19. The display module of claim 11, wherein a surface of the first light guide layer has a microstructure.

20. The display module of claim 11, further comprising:
a third light guide layer disposed on a bottom surface of the first light guide layer, between the first light guide layer and the second light guide layer, or on a top surface of the second light guide layer, wherein a refractive index of the third light guide layer is smaller than the refractive index of the first light guide layer.

* * * * *